Aug. 16, 1938.  A. C. DOBRICK  2,126,951
TUBE CUTTER
Filed Oct. 4, 1935
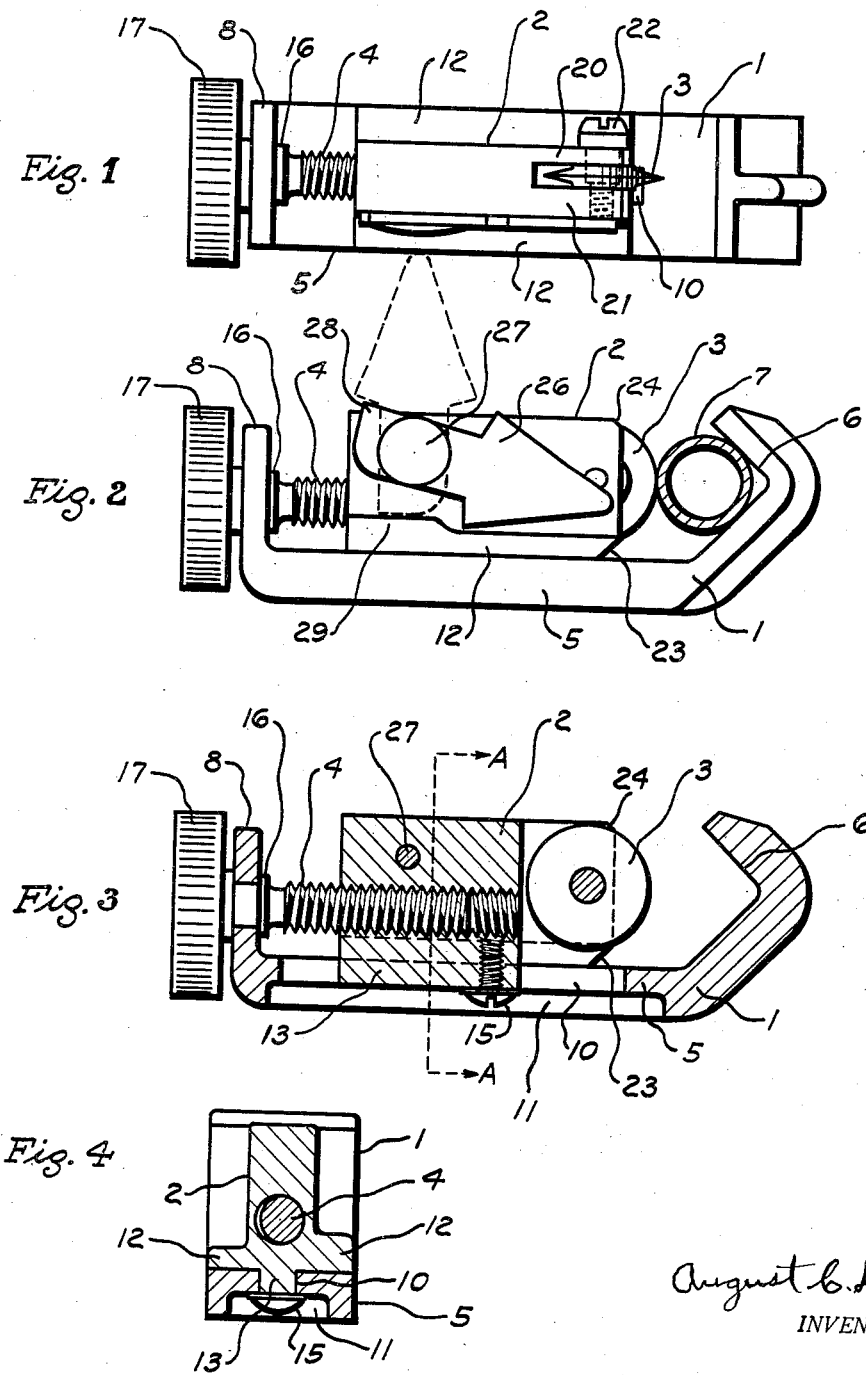
August C. Dobrick
INVENTOR.
BY
ATTORNEYS.

Patented Aug. 16, 1938

2,126,951

UNITED STATES PATENT OFFICE 2,126,951

TUBE CUTTER

August C. Dobrick, Chicago, Ill., assignor to The Imperial Brass Manufacturing Company, Chicago, Ill.

Application October 4, 1935, Serial No. 43,561

4 Claims. (Cl. 30—102)

My invention relates to cutting tools and more particularly to tools for cutting copper and aluminum tubing.

The general object of my invention is to provide a small compact cutting tool which will operate in a minimum of space and one which no amount of use or wear will throw out of fine adjustment.

Another object is to provide a tube cutting tool capable of cutting the smallest of tubes in which the cutting element or disc is mounted on a carriage which reciprocates along the frame where it is positively guided in operation at all positions of adjustment.

Still another object is to provide a tube cutting tool for cutting the smallest tubes in which the cutting disc or wheel is mounted between arms adjustable to maintain it in snug adjustment, the carriage being itself mounted in interengagement with the frame so that when extended against a tube its adjustment remains permanently exact.

A further object is to provide a tube cutting tool in which the carriage for the cutting element is shaped to enter the tube holding recess of the frame in order to accommodate a minimum sized tube without sacrifice of structural performance.

A still further object is to provide a scraper on a tube cutting tool which is retractable against the tool during the cutting operation and is extendible and supported by the carriage during use in handy T shaped grip.

In pursuance of the foregoing objects I aim to provide a small compact cutting tool and scraper, compact in size and positive in alignment during use. Further objects and advantages of my invention will become apparent as the description proceeds, taken in connection with the accompanying drawing which forms a part of this specification.

Fig. 1 of the drawing is a top view of the cutter.
Fig. 2 is a side view.
Fig. 3 shows a side elevation in section and
Fig. 4 is a section on the line AA of Fig. 3.

While my invention is susceptible of embodiment in many different forms, I have shown in the drawing and will herein describe in detail one such embodiment with the understanding the present disclosure is to be considered as an exemplification of the principles of the device and is not intended to limit the invention to the embodiment illustrated. The scope of the invention will be pointed out in the appended claims.

As shown in the drawing a frame 1 supports a carriage 2 carrying a cutting element 3 herein shown as a disc, the carriage being propelled by a screw 4.

Frame 1 is shown with a long straight base 5 having at one end a receiving recess 6 for a tube 7 to be cut and at the other end an upward extending arm 8 which forms a support and brace for the screw 4. Lengthwise in the base 5 a channel 10 is cut which is relieved underneath by a wide recess 11. The carriage 2 is shaped at the bottom to form the shoe 12 upon which it slides along the frame. Protruding below the shoe is a guide member 13 of a size capable of fitting nicely into the channel 10. This member is preferably elongated to provide maximum lateral directional support for the carriage. With the carriage in place on the frame a securing means, here illustrated as a large headed screw 15, is attached to it thru the channel holding it in slidable contact with the frame. The head of the screw is made smaller than the recess 11, so that it can slide along freely with the carriage without binding at either sides or ends.

The propelling or translating screw 4 used to move the carriage is received in the support 8 wherein it is journaled and against which it abuts by means of the shoulder 16 on the screw. The screw is furnished with a knurled wheel 17 for easy turning. The body of the carriage is tapped to accommodate a reverse thread on screw 4 so that a natural clockwise turn of the handle will push the carriage toward cutting position. It will be apparent that the attachment of the carriage to the frame by means of the translating screw makes, combined with the screw 15, a two-point retaining support, which with the help of the guide member 13 in the channel 10 furnishes an absolute guide for the carriage in any and all cutting positions.

At the head end the carriage is approximately U shaped, for receiving and mounting the cutting disc 3 and is shown with one leg 20 slightly lighter than the other at 21. A screw piece 22 freely seated in the leg 20 forms the shaft for the disc and screws threadably into leg 21. Leg 20 is sufficiently flexible so that the disc can be adjusted to a snug fit as the tool becomes worn with use. It is further to be noted that the head end of the carriage is cut back at 23 and 24 to conform to the shape of the tube receiving recess 6 to allow the carriage to be propelled completely into it in order to cut the smallest of tubing.

On the carriage may be mounted a scraper 26 by a rivet 27 which is used to clear the burr from the cut end of a tube. The scraper is foldable along the side of the carriage when not in use and when needed can be opened as shown in the dotted position in Fig. 2 wherein the base 28 of the scraper butts against a raised portion 29 of the shoe 12. A marked advantage in mounting the scraper on the carriage is that it can be moved backward and forward into the most comfortable position when needed thus making the cleaning of the ends of a large number of cut tubes easier and more rapid.

Another feature which adds to the workability, especially over a long period of use is the location of the propelling screw slightly below the center line of the tubing and cutting disc so that a steady true cut is assured when forcing the cutting element into operable position against a tube.

Having thus described my invention what I claim as new and desire to secure by Letters Patent is:

1. A cutting tool for a thin walled tube comprising a frame, a cutting disc, a carriage on the frame for the cutting disc and a screw extending longitudinally within said carriage and acting as the sole reciprocating means for the carriage, a shoe member on the carriage in sliding contact over its entire length with one side of said frame, an extension positioned centerably below said shoe member and a channel in said frame for receiving said extension, an adjustable retaining element extending within said carriage for holding said extension in said channel, a recessed portion in the frame adjacent the channel adapted to slidably receive said element, the longitudinally extending screw being cooperable with the retaining element by reason of extension into the carriage at right angles to each other to rigidly support said carriage at all positions along the path of reciprocation, said carriage having a U shaped head for supporting the cutting disc, a shaft for mounting said disc rotatable in one side of the U and threadably engageable in the other, whereby to vary the space between the sides to snugly accommodate said disc, and a recessed tube receiver in said frame, said carriage being modified at the head for reception into said receiver.

2. A tube cutting tool of the nature disclosed combining a frame, a cutting disc, a carriage for the cutting disc having a screw for propelling said carriage and a sliding surface on said carriage adjacent said frame, means for securing said carriage to and guiding it positively along said frame, said carriage having a nominally U shaped head for supporting the cutting disc, one leg of said U being heavy and unyielding to support the disc, the other leg being lighter and flexible to permit movement, a shaft for mounting said disc rotatable in the flexible leg and threadable into the other leg whereby to adjust the space between said legs to snugly accommodate said disc.

3. A pocket size cutting tool for thin walled tubes comprising an elongated frame having an intermediate, flat base portion, a straight leg at one end of the base portion extending at right angles thereto and forming a supporting element, and a leg at the other end of the base portion extending laterally thereof in the same direction as the first mentioned leg and bent to form a recess in which a tube to be cut is held, said base portion having a longitudinally extending aperture formed therein with a widened portion thereof at the outside of the base, a carriage member mounted on the frame free from the legs comprising a block having a broad bottom running the entire length of said block to support it non-tiltably upon the base portion, said block being provided with a cutting element, and a straight sided, downwardly extending rib integral with the block running the length of said block and engaging the aperture in the base portion to supply a guide for the carriage, said carriage being fastened in sliding relation with the base portion by a retaining and adjusting screw inserted externally of the base portion having a wide head riding in the widened portion of the aperture on the lower side of the base portion and extending perpendicularly upward through the rib into the carriage in threaded engagement therewith for retaining and adjusting the carriage in snug sliding relation with the frame, and a compact screw member for feeding the carriage in and out including a screw portion extending longitudinally through a substantial portion of the block, a neck portion journaled in said first leg of the frame and a single handle comprising a wheel on said screw member positioned compactly adjacent and externally of said first leg to reduce the size of the tool to a minimum and to furnish a convenient grip for rotating the screw to feed the carriage into and out of cutting position.

4. A pocket size cutting tool for thin walled tubes comprising a generally U-shaped frame having one leg thereof shaped in the form of a recess to hold the tube, another leg forming a supporting element and a flat base comprising the bottom of the U extending between said legs having a longitudinal aperture formed therein, a carriage member mounted on the frame free from the legs comprising a block having a broad bottom running the entire length of said block to support it non-tiltably upon the base of the frame, said block being provided with a cutting element, and a straight sided, downwardly extending rib integral with the block running the length of said block and engaging the aperture in the base to supply a guide for the carriage, said carriage being fastened in sliding relation with the base by a screw inserted externally of the base having a wide head riding below the aperture on the lower side of the base and extending perpendicularly upward through the rib into the carriage, and a compact screw member for feeding the carriage in and out including a screw portion extending longitudinally through a substantial portion of the block, a neck portion journaled in said other leg of the frame and a single handle comprising a rotating element on said screw member positioned compactly against the external side of said other leg to reduce the size of the tool to a minimum and to furnish a convenient grip for rotating the screw to feed the carriage into and out of cutting position.

AUGUST C. DOBRICK.